(12) United States Patent
Lee

(10) Patent No.: US 11,736,786 B2
(45) Date of Patent: Aug. 22, 2023

(54) CAMERA MODULE WITH REDUCED SIZE

(71) Applicant: Samsung Electro-Mechanics Co., Ltd, Suwon-si (KR)

(72) Inventor: Jae Chan Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/213,811

(22) Filed: Mar. 26, 2021

(65) Prior Publication Data

US 2022/0070337 A1    Mar. 3, 2022

(30) Foreign Application Priority Data

Aug. 26, 2020 (KR) ......................... 10-2020-0107905

(51) Int. Cl.
*H04N 23/51* (2023.01)
*G03B 17/12* (2021.01)
*G02B 7/02* (2021.01)
*H04N 23/52* (2023.01)

(52) U.S. Cl.
CPC ............. *H04N 23/51* (2023.01); *G02B 7/021* (2013.01); *G02B 7/025* (2013.01); *G03B 17/12* (2013.01); *H04N 23/52* (2023.01)

(58) Field of Classification Search
CPC .......... G02B 7/02; G02B 7/021; G02B 7/025; G02B 13/001; H04N 5/2252; H04N 5/22521; H04N 5/2253; H04N 5/2254; H04N 5/2257; H04N 23/51; H04N 23/52; H04N 23/54; H04N 23/55; H04N 23/57; G03B 17/12; G03B 17/02; G03B 30/00
See application file for complete search history.

(56) References Cited

U.S. PATENT DOCUMENTS

| | | | |
|---|---|---|---|
| 9,338,334 B2 | 5/2016 | Lu et al. | |
| 9,706,099 B2* | 7/2017 | Jung | G03B 17/12 |
| 10,236,312 B2* | 3/2019 | Mada | G02B 7/02 |
| 10,484,586 B1* | 11/2019 | Chen | H04N 5/2253 |
| 2001/0050721 A1* | 12/2001 | Miyake | H01L 27/14618 348/340 |
| 2004/0017620 A1* | 1/2004 | Kaneko | G02B 7/02 359/823 |
| 2004/0080642 A1 | 4/2004 | Kobayashi et al. | |
| 2004/0223072 A1* | 11/2004 | Maeda | H01L 27/14625 257/E31.127 |

(Continued)

FOREIGN PATENT DOCUMENTS

| | | |
|---|---|---|
| JP | 2010-50771 A | 3/2010 |
| JP | 2019-78986 A | 5/2019 |

(Continued)

OTHER PUBLICATIONS

Korean Office Action dated May 27, 2021, in counterpart Korean Patent Application No. 10-2020-0107905 (6 pages in English, 4 pages in Korean).

*Primary Examiner* — Chiawei Chen
(74) *Attorney, Agent, or Firm* — NSIP Law

(57) ABSTRACT

A camera module including a housing, a lens barrel disposed in the housing and configured to accommodate at least one lens, a first substrate including an image sensor configured to receive light passing through the lens, and a second substrate including a through-portion configured to pass the lens barrel.

19 Claims, 5 Drawing Sheets

(56) References Cited

U.S. PATENT DOCUMENTS

| | | | |
|---|---|---|---|
| 2006/0196946 A1* | 9/2006 | Tsai | H04N 5/2254 |
| | | | 235/472.01 |
| 2008/0267603 A1* | 10/2008 | Jung | G02B 13/0035 |
| | | | 396/111 |
| 2011/0102667 A1* | 5/2011 | Chua | H04N 5/2257 |
| | | | 348/374 |
| 2014/0043524 A1* | 2/2014 | Azuma | G03B 3/10 |
| | | | 348/345 |
| 2014/0320657 A1 | 10/2014 | Han et al. | |
| 2015/0271372 A1* | 9/2015 | Sekimoto | G02B 7/08 |
| | | | 348/335 |
| 2015/0319348 A1* | 11/2015 | Jung | G03B 17/12 |
| | | | 348/360 |
| 2018/0048796 A1* | 2/2018 | Hsu | G03B 17/14 |
| 2018/0224716 A1 | 8/2018 | Joo | |
| 2019/0227411 A1* | 7/2019 | Park | H05K 9/00 |
| 2020/0068101 A1* | 2/2020 | An | H04N 5/228 |
| 2020/0145560 A1 | 5/2020 | Han | |
| 2020/0252527 A1 | 8/2020 | Nakamura | |
| 2021/0325765 A1* | 10/2021 | Liu | G03B 30/00 |
| 2022/0046791 A1* | 2/2022 | Han | H04N 23/00 |

FOREIGN PATENT DOCUMENTS

| | | |
|---|---|---|
| KR | 10-2004-0027351 A | 4/2004 |
| KR | 10-1428842 B1 | 8/2014 |
| KR | 10-2017-0009078 A1 | 1/2017 |
| KR | 10-2018-0042566 A | 4/2018 |
| KR | 10-2018-0085195 A | 7/2018 |

\* cited by examiner

CAMERA MODULE WITH REDUCED SIZE

CROSS-REFERENCE TO RELATED APPLICATION(S)

This application claims the benefit under 35 USC 119(a) Korean Patent Application No. 10-2020-0107905 filed on Aug. 26, 2020 in the Korean Intellectual Property Office, the entire disclosure of which is incorporated herein by reference for all purposes.

BACKGROUND

1. Field

The present disclosure relates to a camera module.

2. Description of Related Art

Image sensor-based cameras have been widely used in vehicles to provide convenience to a driver. Such a system may, by capturing an image of a portion of an environment surrounding the vehicle and displaying the captured image on a monitor in front of a driver, more precisely sense a position and orientation of a vehicle with respect to other objects (e.g., other vehicles, pedestrians, cyclists, buildings, trees, roads, parking signs, and the like), may improve control over traffic conditions, and may thus improve stability in driving. In particular, with the development of distance recognition and object classification for use in autonomous driving technology, for example, using a camera, LiDAR, RADAR, and the like, accurate sensing and determination for various situations that may occur during actual driving have been necessary.

As the requirement required for a camera increases, the camera module may increase in size. However, a camera module mounted on a vehicle may need to have a reduced size to be disposed on an exterior of a vehicle without affecting the vehicle's aesthetics. For example, in the case of an e-Mirror, which has been ergonomically designed to reduce air resistance caused by a typical side mirror, the space in which the camera module is installed may be relatively narrower than that of camera modules provided in the other positions of the vehicle. Thus, it may be essential for the camera module to have a reduced size. A camera module has been designed to have increased resolution and has been designed to include a system-on-chip type sensor by adding a component such as an image signal processor (ISP) to a CMOS. Recently, there has been an attempt to reduce a camera module volume by assigning an ISP function to an ECU. Also, in a power module for power supply, three or more components such as DCDC/LDO have been applied, but a PMIC having three or more channels has increasingly been used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module including a housing, a lens barrel disposed in the housing and configured to accommodate at least one lens, a first substrate including an image sensor configured to receive light passing through the lens, and a second substrate including a through-portion configured to pass the lens barrel.

A portion of the lens barrel may be disposed between the first substrate and the second substrate.

A distance between the at least one lens and the first substrate may be smaller than a distance between the second substrate and the first substrate.

The housing may further include a filling member disposed to partially or entirely fill an internal space thereof.

The filling member may form an external portion of the camera module.

The filling member may be formed of epoxy.

The camera module may further include a coupling member having one end coupled to the first substrate and another end coupled to the second substrate.

The coupling member may include a groove configured to accommodate an edge portion of the second substrate.

The coupling member may electrically connect the first substrate to the second substrate.

The coupling member may include a non-conductive substrate and at least one conductive pattern formed on the non-conductive substrate.

The conductive pattern may electrically connect the second substrate to the first substrate.

The coupling member may include an elastic material.

The lens barrel may extend in an optical axis direction from one end disposed on a surface of the first substrate on which the image sensor is disposed.

The housing may include a plate opposing and spaced apart from the second substrate, and a sidewall extending towards the first substrate from an edge of the plate.

The camera module may further include a coupling member including a base coupled to one surface of the second substrate, and an extension part extending from the base towards the first substrate and including a fastening groove configured to partially accommodate the first substrate in a portion thereof.

In another general aspect, a camera module includes a housing, a lens barrel disposed in the housing and configured to accommodate at least one lens, a first substrate including an image sensor configured to receive light passing through the lens, and a second substrate spaced apart from the first substrate in an optical axis direction. The second substrate is disposed in a position overlapping the lens barrel in the optical axis direction.

The second substrate may include a through-portion configured to pass the lens barrel.

A filling member may be disposed in an internal space of the housing.

The filling member may be epoxy or silicone gel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
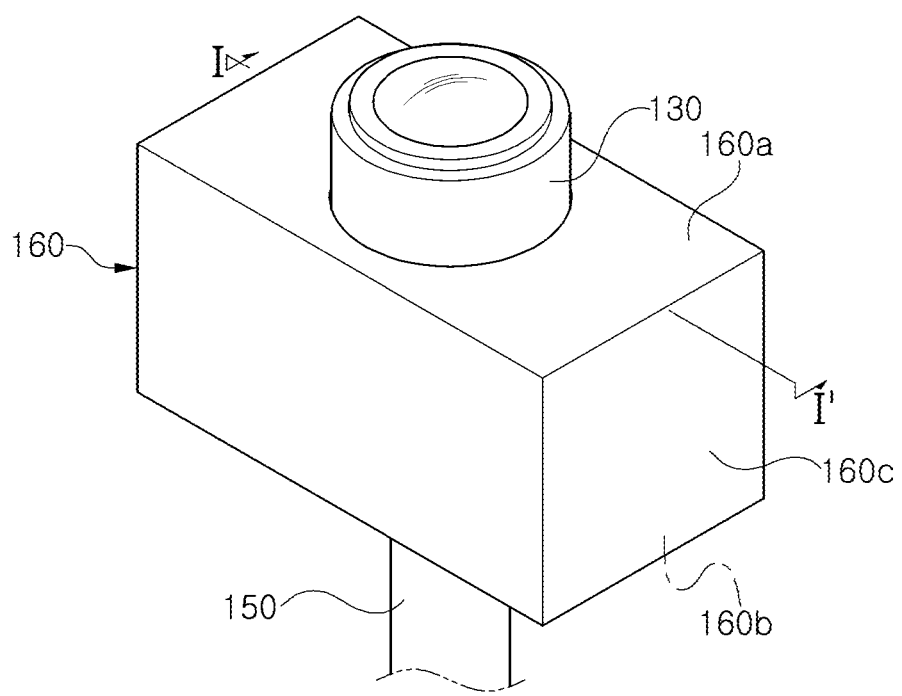
FIG. 1 is a perspective diagram illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An aspect of the present disclosure is to provide a camera module having improved performance and a reduced size, and more particularly, a camera module mounted on a vehicle which may have a reduced size in an optical axis direction and/or a reduced size in a direction perpendicular to an optical axis.

Another aspect of the present disclosure is to provide a camera module including components which may be easily assembled at lower cost when the camera module is manufactured.

Figure 2:
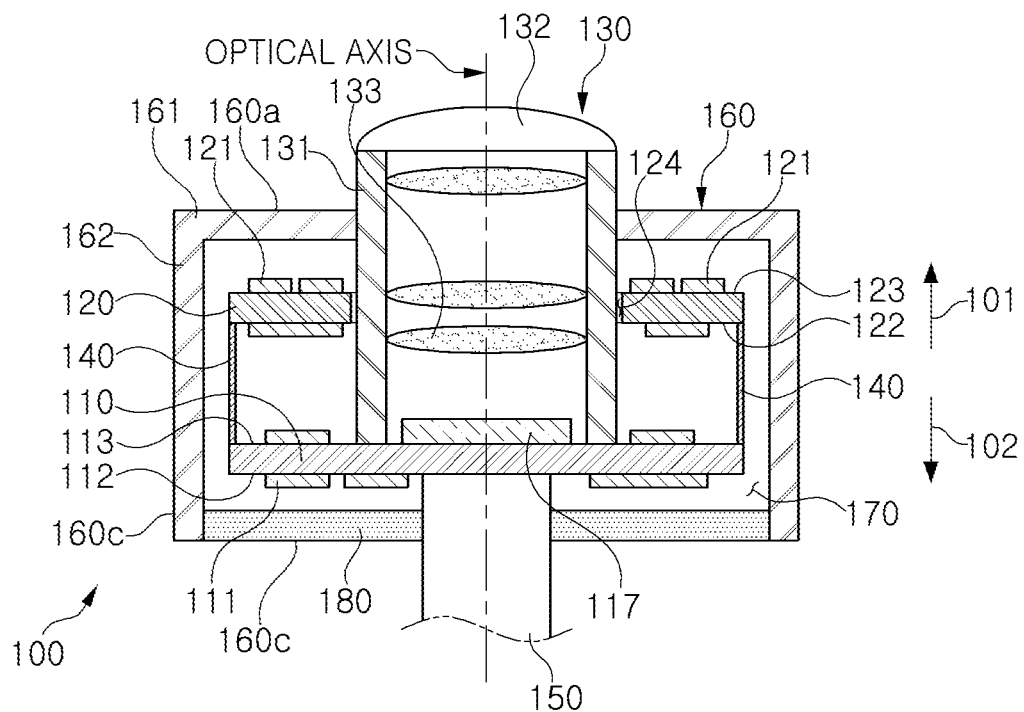
FIG. 2 is a cross-sectional diagram illustrating an example of a camera module taken along line I-I' in FIG. 1.
Figure 3:
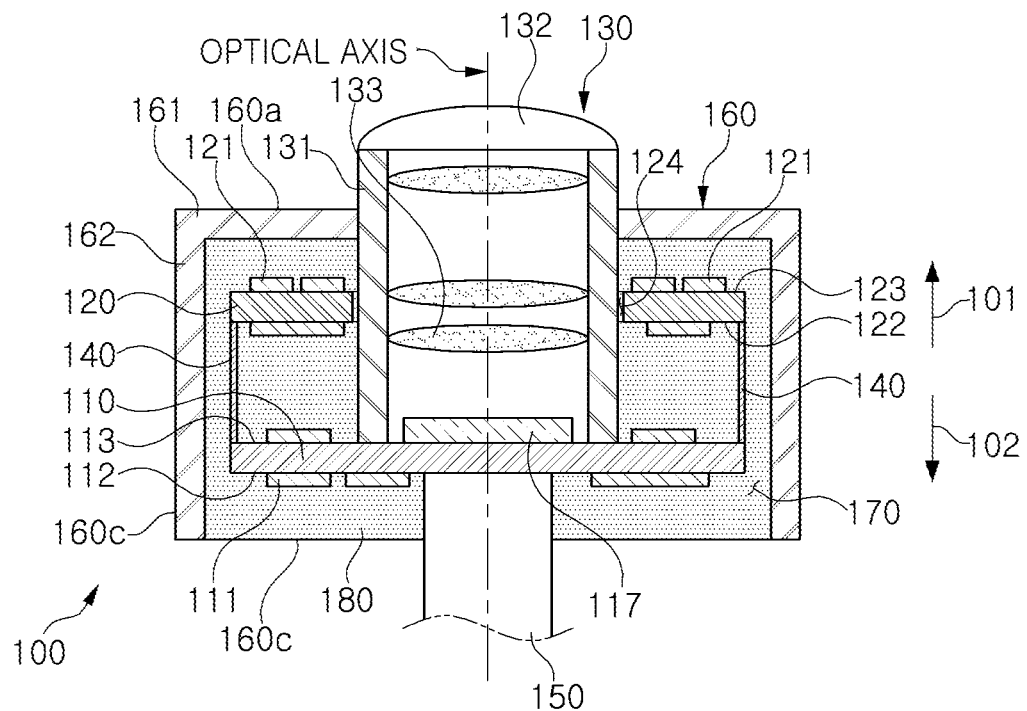
FIG. 3 is a cross-sectional diagram illustrating another example of a camera module taken along line I-I' in FIG. 1.
Figure 4:
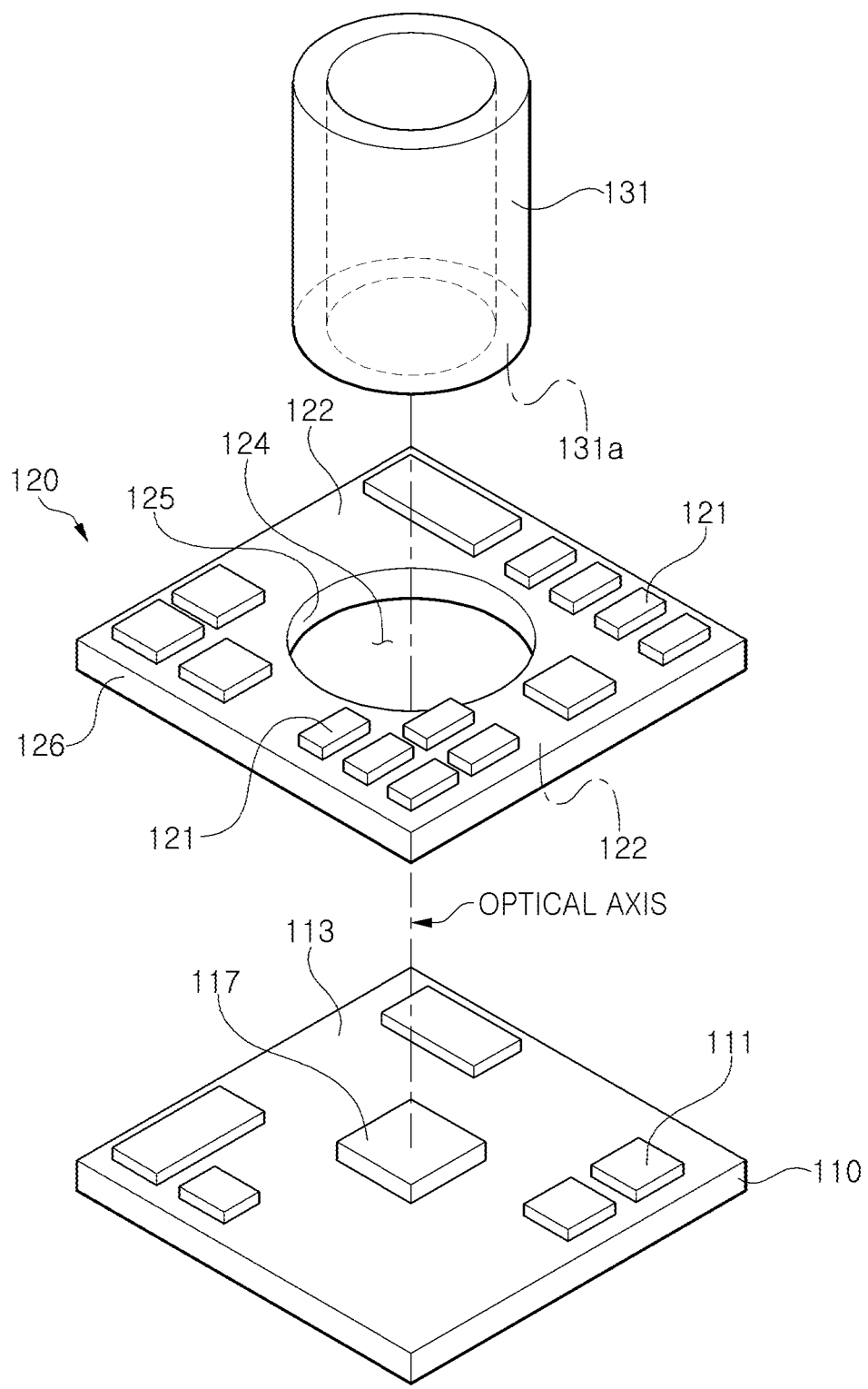
FIG. 4 is an exploded diagram illustrating an example of a lens barrel and a camera module's substrates.

FIG. 1 is a perspective diagram illustrating an example of a camera module. FIG. 2 is a cross-sectional diagram illustrating an example of a camera module taken along line I-I' in FIG. 1. FIG. 3 is a cross-sectional diagram illustrating an example of a camera module taken along line I-I' in FIG. 1. FIG. 4 is an exploded diagram illustrating an example of a lens barrel and substrates of a camera module.

In FIG. 1, in an example, the camera module 100 may include a housing 160 and a lens assembly 130. A portion of the lens assembly 130 may be exposed externally of the housing 160 through a portion of the housing 160. For example, a portion of the lens assembly 130 may be exposed externally through an opening formed in a front surface 160a of the housing 160.

In FIG. 2, in an example, the camera module 100 may include two or more substrates disposed in the housing 160. In an example, the camera module 100 may include a first substrate 110 and a second substrate 120 opposing and spaced apart from the first substrate 110. When two or more substrates 110 and 120 are disposed to oppose each other as in a sandwich, the electronic components 111 and 121 required for the camera module 100 may be divided and mounted on the substrates, such that the camera module 100 may have a compact internal structure spatially.

In an example, the camera module 100 may include various electronic components 111 and 121 (e.g., an MLCC, a PMIC, and a processor). The various electronic components may be mounted on the first substrate 110 and the second substrate 120. In the diagrams, a plurality of electronic components may be mounted on upper surfaces 112 and 122 and/or lower surfaces 113 and 123 of the first substrate 110 and the second substrate 120.

In an example, the image sensor 117 may be mounted on the first substrate 110. For example, the image sensor 117 may be mounted on an upper surface 113 (or a first surface) of the first substrate 110, directed in the first direction 101. The image sensor 117 may generate an image signal in response to light received through the lens assembly 130.

In an example, the camera module 100 may include a connector 150 for communication of data obtained from the image sensor 117 and/or power supply. In an example, the connector 150 may be electrically connected to the first substrate 110 and/or the second substrate 120.

In an example, the lens assembly 130 may include at least one lens 133 and a lens barrel 131 accommodating at least one lens 133. In an example, the lens assembly may further include a transparent member 132 disposed on an upper end of the lens barrel. The transparent member 132 may be configured as one type of lens.

In an example, the lens assembly 130 may include a plurality of lenses, and the plurality of lenses may be aligned side by side along an optical axis. In the illustrated example, the plurality of lenses may have similar shapes, and in another example, the lenses may have different diameters and different thicknesses.

In an example, the lens barrel 131 may be configured to accommodate at least one lens 133, and at least one lens 133 may be aligned along the optical axis. For example, the lens barrel 131 may have a shape of a hollow cylinder having a central axis the same as the optical axis. It may accommodate a plurality of lenses 133 on an inner circumferential surface. In the illustrated example, the inner circumferential surface of the lens barrel 131 may have a constant inner circumferential diameter, but an example thereof is not limited thereto. In another example, the lens barrel 131 may include at least one stepped portion stepped in a length direction of the lens barrel 131 on the inner circumferential surface thereof. For example, the lens barrel 131 may have various inner circumferential diameters. A stepped portion may be formed on a boundary on which the inner circumferential diameter differs, and an outer portion of at least one lens 133 may be seated (or coupled) to the stepped portion.

In an example, the lens barrel 131 may be mounted on the first substrate 110. In FIG. 4, a bottom surface 131a of the lens barrel 131 may be mounted on an upper surface 113 of the first substrate 110. When the lens assembly 130 is assembled to the first substrate 110, at least one lens 133 may be aligned with the image sensor 117. For example, a central axis of the one lens 133 may penetrate a center of a sensor surface of the image sensor 117 vertically.

In an example, the lens barrel 131 may extend from a bottom surface 131a towards a through-portion 124 of the second substrate 120. In an example, an extended length of the lens barrel 131 may be greater than the distance between the first substrate 110 and the second substrate 120. Accordingly, a portion of the lens barrel 131 may be positioned between the first substrate 110 and the second substrate 120, and the other portion may protrude from the second substrate 120 in the first direction 101.

In an example, at least one lens 133 may be disposed more adjacent to the first substrate 110 than the second substrate 120. For example, a distance between a lens (or a rearmost lens) disposed most adjacent to the image sensor 117 among the at least one lens 133 and the upper surface 113 of the first substrate 110 may be shorter than a distance between the upper surface 113 of the first substrate 110 and the lower surface 122 of the second substrate 120.

When the camera module 100 includes a wide-angle lens, a focal length (a distance between the rearmost lens and an image sensor surface) may generally be 2 mm or less, and the first substrate 110 and the second substrate 120 may be spaced apart from each other by a distance (e.g., approximately 4 mm) greater than 2 mm due to the electronic components 111 and 121 mounted on the surfaces 113 and 122 opposing each other.

In an example, the second substrate 120 may include a through-portion 124 through which the lens barrel 131 passes. In an example, the through-portion 124 may have a shape corresponding to an outer circumferential surface of the lens barrel 131. For example, when the lens barrel 131 has a circular outer circumferential surface, the second substrate 120 may also include a circular through-portion 124. In the illustrated example, a gap may be formed between the through-portion 124 and the outer circumferential surface of the lens barrel 131, but an example thereof is not limited thereto. In another example, the lens barrel 131 may be tightly inserted into the second substrate 120.

In an example, the second substrate 120 may be disposed in a position overlapping the first substrate 110 in the optical axis direction. In an example, the second substrate 120 may be disposed to overlap a partial region of the first substrate 110. In an example, the second substrate 120 may have a shape formed by removing a portion of the second substrate 120 illustrated in FIG. 4. For example, a portion of the through-portion 124 of the second substrate 120 may be opened in a direction perpendicular to the optical axis such that inner circumferential surface 125, which defines the through-portion 124, and the side surface 126 of the second substrate 120 may form a single closed curve.

In the illustrated example, the camera module 100 may include two substrates 110 and 120, but an example thereof is not limited thereto. In another example, three or more substrates may be disposed to oppose one another and to be spaced apart from one another. In this case, the substrates other than the first substrate 110 on which the image sensor 117 is mounted may include through-portions in which a portion of the lens barrel 131 is disposed. For example, the camera module 100 may include a third substrate spaced apart from the second substrate 120 in the first direction 101, and the third substrate may include a through-portion aligned with the image sensor 117.

In FIG. 1, in an example, the first substrate 110 and the second substrate 120 may be coupled to each other through at least one coupling member 140. In an example, the coupling member 140 may be disposed on both sides between the first substrate 110 and the second substrate 120, and the first substrate 110 and the second substrate 120 may be disposed with a gap therebetween. The coupling member 140 will be described in greater detail with reference to FIGS. 3 to 5.

In an example, the camera module 100 may include a housing 160. The housing 160 may form a front side 160a and a portion of a side surface 160c of the camera module 100.

In an example, the housing 160 may be configured to accommodate at least the substrates 110 and 120 of the camera module 100. The housing 160 may accommodate a portion of the lens assembly 130. The other portion of the lens assembly 130 may protrude externally of the housing 160.

In an example, the housing 160 may include a plate 161 disposed in the first direction 101 of the second substrate 120, and a sidewall 162 extending from an edge of the plate 161 in the second direction 102. The plate 161 and the sidewall 162 may form the front surface 160a and a portion of the side surface 160c of the camera module 100, respectively.

In an example, the sidewall 162 may be configured to enclose the substrates 110 and 120 and the lens assembly 130. For example, components included in the camera module 100 may be disposed in a space 170 defined by the plate 161 and the sidewall 162. For example, when the plate 161 has a quadrangular shape, an outer circumferential surface of the sidewall 162 may have a quadrangular pillar shape extending from an edge of the plate 161. As another example, when the plate 161 has a circular shape, the outer circumferential surface of the sidewall 162 may have a cylindrical shape extending from the edge of the plate 161. In an example, the space 170 defined by the housing 160 may be open in the second direction 102.

In an example, the camera module 100 may include a filling member 180 for filling at least a portion of the internal space 170 of the housing 160. The filling member 180 may be implemented by injecting a liquid material into the housing 160 and curing the material. For example, the filling member 180 may include epoxy or silicone gel.

In an example, the filling member 180 may be configured to protect the components (e.g., the first substrate 110 and the second substrate 120) disposed in the internal space 170 of the housing 160.

In an example, the filling member 180 may form a portion of an exterior of the camera module 100. For example, the filling member 180 may form a portion of the rear surface 160b of the camera module 100. For example, the filling member 180 may have a predetermined thickness and may be configured to have a plate shape spaced apart from and opposing the first substrate 110.

In FIG. 3, in an example, the filling member 180 may fill the entire internal space the housing 160. The filling member 180 may be disposed in the overall internal space of the camera module other than the internal portion of the lens barrel 131.

Figure 5:
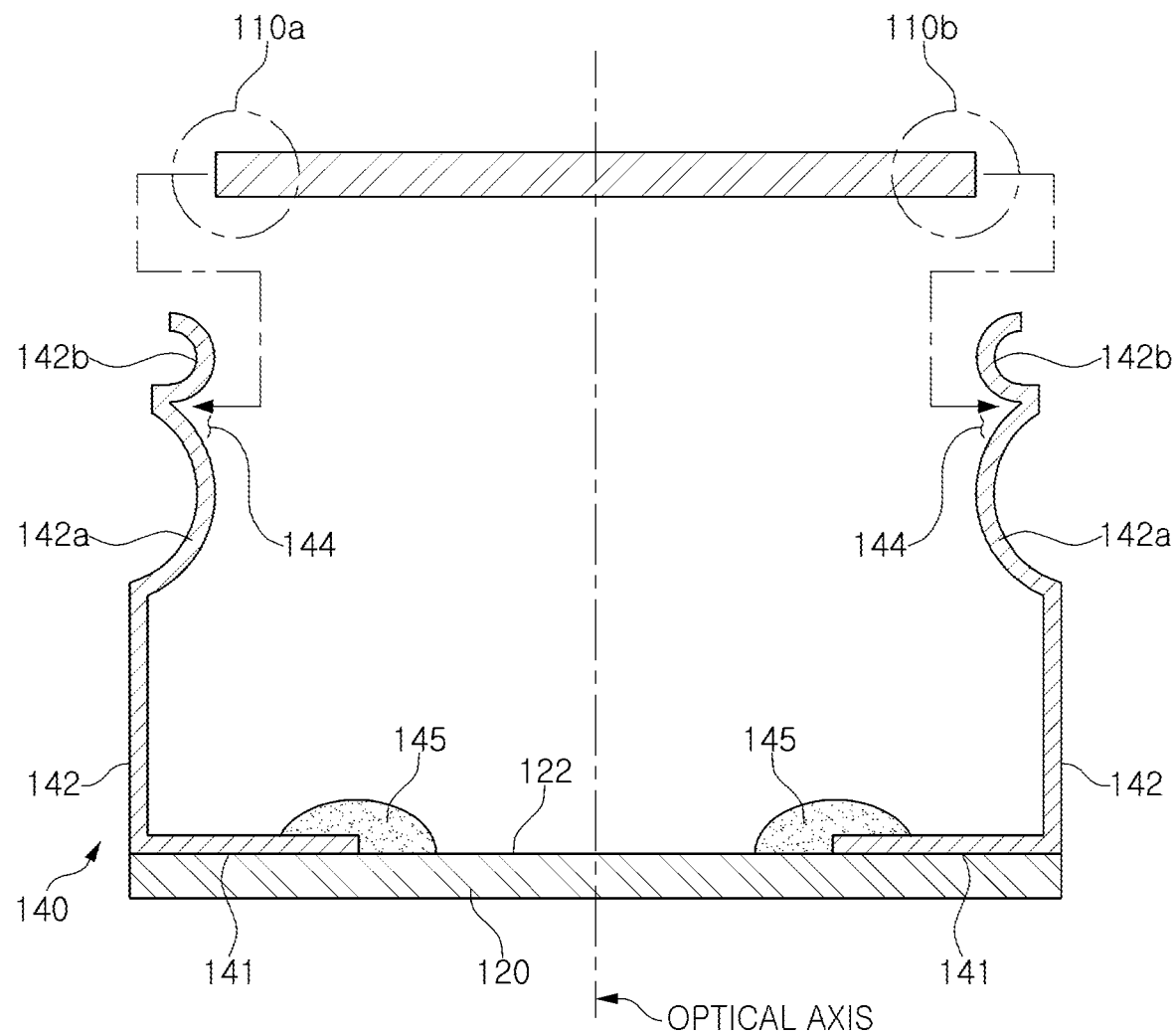
FIG. 5 is a diagram illustrating an example of a coupling member for coupling two substrates to each other.

FIG. 5 is a diagram illustrating an example of a coupling member 140 for coupling two substrates 110 and 120 to each other.

FIG. 5 illustrates a cross-section surface of the coupling member 140. The coupling member 140 may have a shape in which the illustrated cross-section surface extends in a length direction (e.g., a direction perpendicular to the paper). In an example, the coupling member 140 may be formed of a material having elasticity and easily formed. For example, the coupling member 140 may include at least one of synthetic resin and plastic.

In FIG. 5, the coupling member 140 may be coupled and fixed to the second substrate 120. For example, the coupling member 140 may include a base 141 extending along the upper surface 122 of the second substrate 120. The base 141 may be coupled to the upper surface 122. For example, an adhesive member may be attached to a region between the base 141 and the upper surface 122 of the second substrate 120. As another example, the base 141 may be fixed to the upper surface 122 of the second substrate 120 through solder 145.

In an example, the coupling member 140 may include an extension part 142 extending from one end of the base 141 towards the first substrate 110. In an example, the coupling member 140 may include a fastening groove 144 formed in a portion of the extension part 142. In an example, the fastening groove 144 may be configured to accommodate at least a portion of the edge of the first substrate 110. For example, a first side edge 110a and a second side edge 110b of the first substrate 110 may be accommodated in the corresponding fastening grooves 144 of the coupling member 140, respectively. When the first side edge 110a and the second side edge 110b of the first substrate 110 are accommodated in the fastening grooves 144 of the coupling member 140, respectively, the first substrate 110 may be coupled to the second substrate 120 to oppose and to be spaced apart from the second substrate 120.

In another example, the coupling member 140 may be fixed to the first substrate 110, and the coupling groove 144 of the coupling member 140 may be configured to accommodate the second substrate 120. For example, the base of the coupling member 140 may be coupled and fixed to the first substrate 110, and the extension part extending from the base towards the second substrate 120 may include a fastening groove configured to accommodate a portion of the edge of the second substrate 120.

In an example, the fastening groove 144 may be provided by a continuous bent portion. For example, the extension part 142 may include a first bent portion 142a and a second bent portion 142b, each having an inwardly convex shape, and a recess between the two bent portions 142a and 142b may function as the fastening groove 144. The shape of the coupling member 140 illustrated in the example is merely an example, and an example thereof is not limited thereto. In another example, the shape of the coupling member 140 may be varied. For example, a curvature of the first bent portion 142a and the second bent portion 142b may differ from that of the illustrated example.

Figure 6:
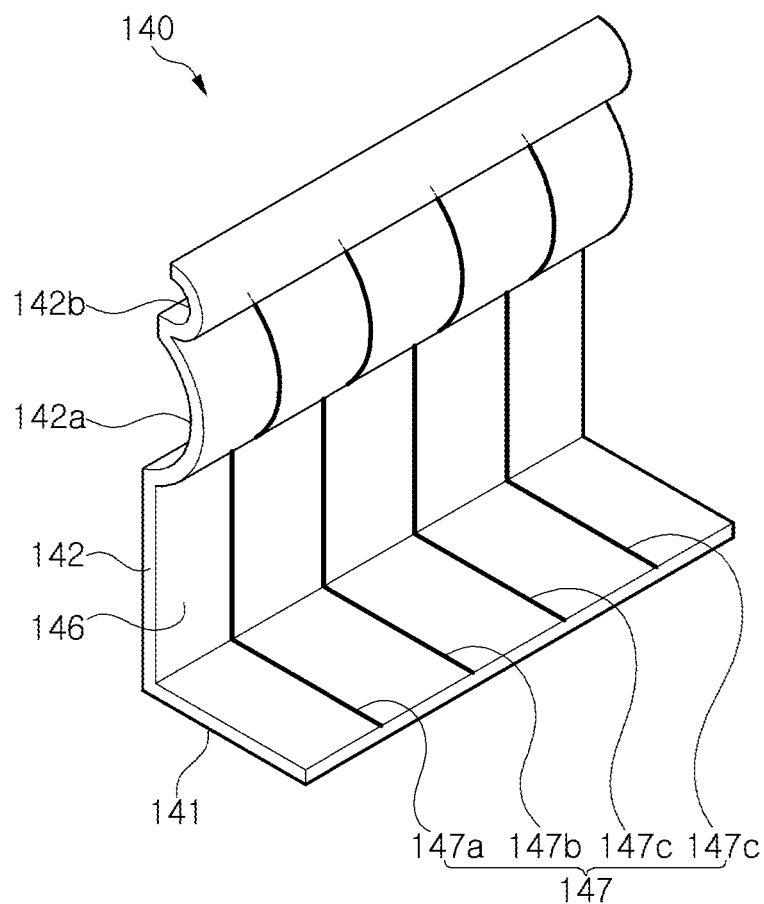
FIG. 6 is a diagram illustrating an example of a conductive pattern provided in a coupling member.

FIG. 6 is a diagram illustrating an example of a conductive pattern 147 provided in a coupling member 140.

In FIG. 6, the coupling member 140 may be configured to electrically connect the first substrate 110 to the second substrate 120. In an example, the coupling member 140 may include a conductive pattern 147. The conductive pattern 147 may be configured to electrically connect the first substrate 110 to the second substrate 120. For example, In FIG. 1, power supplied to the first substrate 110 through the connector 150 may be supplied to the electronic component 121 of the second substrate 120 through the conductive pattern 147 of the coupling member 140. As another example, power supplied to the second substrate 120 may be supplied to the electronic component 111 disposed on the first substrate 110 through the conductive pattern 147 of the coupling member 140.

In an example, the conductive pattern 147 may be configured to be exposed to the internal surface 146 of the coupling member 140. In an example, the conductive pattern 147 may be configured to be exposed to at least a portion of the fastening groove 144 of the coupling member 140. When a portion of the first substrate 110 is accommodated in the fastening groove 144 of the coupling member 140, the first substrate 110 may contact a portion of the coupling member 140. The conductive pattern 147 of the coupling member 140 may be electrically connected to the first substrate 110 through a contact point (or surface).

In an example, the conductive pattern 147 may be integrated with a substrate of the coupling member 140 by a double injection method. In an example, the substrate of the coupling member 140 may be formed of a non-conductive material. For example, the coupling member 140 may be formed of plastic, synthetic resin, or the like.

In the example, a means for physically connecting the first substrate 110 to the second substrate 120 and a means for electrically connecting the first substrate 110 to the second substrate 120 may be integrated into the coupling member 140. Generally, two substrates may be bolt-coupled, and the substrates may include holes for the bolt-coupling. In the example, the two substrates 110 and 120 may be coupled to each other by the coupling member 140, and there may be no need to have holes for bolt-coupling, such that a length of the camera module 100 may be reduced in the direction perpendicular to the optical axis.

Figure 7:
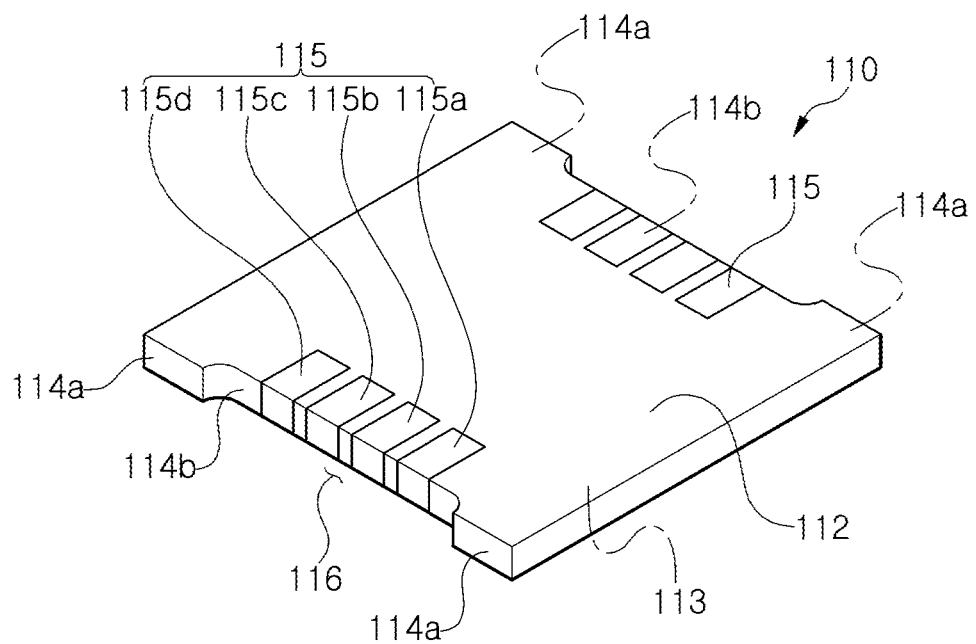
FIG. 7 is a diagram illustrating an example of a substrate including a conductive pad.

FIG. 7 is a diagram illustrating an example of a substrate including a conductive pad.

In FIGS. 6 and 7, in an example, the first substrate 110 may include recesses 116 in opposing edges. A recessed surface 114b may be accommodated in the fastening groove 144 of the coupling member 140. The portion 114a of the first substrate 110 protruding further than the recessed surface 114b may prevent the first substrate 110 from moving in a length direction of the fastening groove 144 or may reduce the above-described movement, when the first substrate 110 is coupled to the coupling member 140.

In an example, the first substrate 110 may include at least one conductive pad 115 on the upper surface 112. For example, the first substrate 110 may include four conductive pads 115a, 115b, 115c, and 115d on an edge. In an example, the conductive pads 115a, 115b, 115c, and 115d may extend to a side surface of the first substrate 110 (for example, the recessed surface 114b).

In an example, the conductive pads 115 may be electrically connected to the conductive pattern 147 provided on the coupling member 140. For example, when the first substrate 110 is accommodated in the fastening groove 144 of the coupling member 140, the first conductive pad 115a, the second conductive pad 115b, the third conductive pad 115c, and the fourth conductive pad 115d may be in contact with the first conductive pattern 147a, the second conductive pattern 147b, the third conductive pattern 147c, and the fourth conductive pattern 147d, respectively. In an example, the conductive pad 115 and the conductive pattern 147 may be firmly coupled to each other through solder. The shape and the number of the conductive patterns 147 illustrated in the example are merely examples, and the examples thereof are not limited thereto.

According to the aforementioned one or more examples, the length of the camera module in the optical axis direction and/or the length in the direction perpendicular to the optical axis may be reduced.

Also, the camera module components may be easily assembled at a lower cost when the camera module is manufactured.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a lens barrel disposed in the housing and configured to accommodate at least one lens;
   a first substrate, disposed in the housing, and including an image sensor configured to receive light passing through the lens;
   a second substrate, disposed in the housing while being spaced apart from the first substrate, and including a through-portion configured to pass the lens barrel, and
   a coupling member, extending in the optical axis direction between the first substrate and the second substrate, and configured to overlap the lens barrel in a direction perpendicular to an optical axis direction.

2. The camera module of claim 1, wherein a portion of the lens barrel is disposed between the first substrate and the second substrate.

3. The camera module of claim 1, wherein a distance between the at least one lens and the first substrate is smaller than a distance between the second substrate and the first substrate.

4. The camera module of claim 1, wherein the housing further includes a filling member disposed to partially or entirely fill an internal space thereof.

5. The camera module of claim 4, wherein the filling member forms an external portion of the camera module.

6. The camera module of claim 4, wherein the filling member is formed of epoxy.

7. The camera module of claim 1, wherein the coupling member is configured to have one end coupled to the first substrate and another end coupled to the second substrate.

8. The camera module of claim 7, wherein the coupling member includes a groove configured to accommodate an edge portion of the second substrate.

9. The camera module of claim 7, wherein the coupling member electrically connects the first substrate to the second substrate.

10. The camera module of claim 7, wherein the coupling member includes a non-conductive substrate and at least one conductive pattern formed on the non-conductive substrate.

11. The camera module of claim 10, wherein the conductive pattern electrically connects the second substrate to the first substrate.

12. The camera module of claim 7, wherein the coupling member includes an elastic material.

13. The camera module of claim 1, wherein the lens barrel extends in an optical axis direction from one end disposed on a surface of the first substrate on which the image sensor is disposed.

14. The camera module of claim 13, wherein the housing includes a plate opposing and spaced apart from the second substrate, and a sidewall extending towards the first substrate from an edge of the plate.

15. The camera module of claim 13, further comprising:
   a coupling member including a base coupled to one surface of the second substrate, and an extension part extending from the base towards the first substrate and including a fastening groove configured to partially accommodate the first substrate in a portion thereof.

16. The camera module of claim 1, wherein the first substrate and the second substrate comprise electronic components mounted to respective upper surfaces and lower surfaces of the first substrate and the second substrate.

17. A camera module, comprising:
   a housing;
   a lens barrel disposed in the housing and configured to accommodate at least one lens;

a first substrate including an image sensor configured to receive light passing through the lens; and a second substrate spaced apart from the first substrate in an optical axis direction, wherein the second substrate includes a through-portion configured to pass the lens barrel, and is disposed in a position overlapping the lens barrel in the optical axis direction.

18. The camera module of claim 17, wherein a filling member is disposed in an internal space of the housing.

19. The camera module of claim 18, wherein the filling member is epoxy or silicone gel.

\* \* \* \* \*